US012332065B2

(12) United States Patent
Oh

(10) Patent No.: US 12,332,065 B2
(45) Date of Patent: Jun. 17, 2025

(54) DEVICE AND METHOD FOR GENERATING LANE INFORMATION

(71) Applicant: HYUNDAI MOBIS Co., Ltd., Seoul (KR)

(72) Inventor: Jun Hyeong Oh, Yongin-si (KR)

(73) Assignee: HYUNDAI MOBIS Co., Ltd., Seoul (KR)

(*) Notice: Subject to any disclaimer, the term of this patent is extended or adjusted under 35 U.S.C. 154(b) by 322 days.

(21) Appl. No.: 17/874,249

(22) Filed: Jul. 26, 2022

(65) Prior Publication Data
US 2023/0031485 A1 Feb. 2, 2023

(30) Foreign Application Priority Data

Jul. 29, 2021 (KR) .................. 10-2021-0099621

(51) Int. Cl.
*G01C 21/34* (2006.01)
*G01C 21/36* (2006.01)

(52) U.S. Cl.
CPC ..... *G01C 21/3461* (2013.01); *G01C 21/3617* (2013.01)

(58) Field of Classification Search
CPC ................ G01C 21/3461; G01C 21/3617
USPC ............................................. 701/533
See application file for complete search history.

(56) References Cited

U.S. PATENT DOCUMENTS

| 5,615,116 | A | * | 3/1997 | Gudat | B60K 31/04 |
| | | | | | 318/587 |
| 8,855,912 | B2 | * | 10/2014 | Miura | G01C 21/3469 |
| | | | | | 701/534 |
| 9,037,404 | B2 | * | 5/2015 | Ibrahim | G05D 1/0055 |
| | | | | | 701/446 |
| 9,321,461 | B1 | | 4/2016 | Silver et al. | |
| 9,672,734 | B1 | * | 6/2017 | Ratnasingam | G08G 1/096741 |
| 9,747,506 | B2 | * | 8/2017 | Mullen | G08G 1/096775 |
| 9,836,052 | B1 | * | 12/2017 | Silver | B60W 30/0956 |
| 10,275,664 | B2 | * | 4/2019 | Mullen | G08G 1/09675 |
| 10,627,816 | B1 | * | 4/2020 | Silver | G05D 1/0214 |
| 11,327,493 | B1 | * | 5/2022 | Silver | B62D 6/00 |
| 11,414,100 | B2 | * | 8/2022 | Tsuji | G01C 21/3407 |
| 11,682,304 | B2 | * | 6/2023 | Lee | B60W 50/14 |
| | | | | | 701/301 |

(Continued)

FOREIGN PATENT DOCUMENTS

| CN | 110998691 A | 4/2020 |
| CN | 112400095 A | 2/2021 |
| KR | 10-2021-0029323 A | 3/2021 |

OTHER PUBLICATIONS

Office Action issued on Feb. 27, 2025 in Chinese Patent Application No. 2022108917494 with English translation Note: U.S. Pat. No. 2014145864A cited therein is already of record.

*Primary Examiner* — Luis A Martinez Borrero
(74) *Attorney, Agent, or Firm* — Morgan, Lewis & Bockius LLP

(57) ABSTRACT

The present disclosure provides a device and method for generating lane information. The method includes obtaining information on a structure located around a vehicle and driving information of a surround vehicle based on information collected by a sensor and prestored navigation information; and generating geometric information on a travel lane of the vehicle in a road area based on the information on the structure and the driving information of the surround vehicle.

15 Claims, 6 Drawing Sheets

(56) References Cited

U.S. PATENT DOCUMENTS

| | | | | |
|---|---|---|---|---|
| 11,829,138 | B1* | 11/2023 | Silver | B60W 60/0016 |
| 2010/0082248 | A1* | 4/2010 | Dorum | G06F 16/29 |
| | | | | 701/533 |
| 2012/0095671 | A1* | 4/2012 | Matsumura | G08G 1/161 |
| | | | | 701/117 |
| 2012/0221207 | A1* | 8/2012 | Nakamura | G08G 1/166 |
| | | | | 701/41 |
| 2014/0145864 | A1* | 5/2014 | Kim | G08G 1/0129 |
| | | | | 340/988 |
| 2014/0358321 | A1* | 12/2014 | Ibrahim | G01S 19/14 |
| | | | | 701/1 |
| 2014/0358322 | A1* | 12/2014 | Ibrahim | G05D 1/0055 |
| | | | | 701/1 |
| 2014/0358420 | A1* | 12/2014 | Noh | G01C 21/28 |
| | | | | 701/409 |
| 2015/0307095 | A1* | 10/2015 | Aso | B60W 30/10 |
| | | | | 701/1 |
| 2016/0272243 | A1* | 9/2016 | Matsuno | G05D 1/0231 |
| 2017/0116485 | A1* | 4/2017 | Mullen | G08G 1/09626 |
| 2017/0123434 | A1* | 5/2017 | Urano | G08G 1/096791 |
| 2017/0169711 | A1 | 6/2017 | Baek | |
| 2017/0197634 | A1* | 7/2017 | Sato | G05D 1/0061 |
| 2017/0308759 | A1* | 10/2017 | Mullen | G06V 20/56 |
| 2017/0315551 | A1* | 11/2017 | Mimura | B60W 30/143 |
| 2018/0307920 | A1* | 10/2018 | Lee | B60W 50/14 |
| 2019/0018419 | A1* | 1/2019 | Lee | G08G 1/096708 |
| 2019/0071098 | A1* | 3/2019 | Asakura | G08G 1/167 |
| 2019/0179324 | A1* | 6/2019 | Rottkamp | G08G 1/09675 |
| 2019/0369616 | A1* | 12/2019 | Ostafew | G08G 1/0112 |
| 2020/0156644 | A1* | 5/2020 | Chae | G01C 21/3655 |
| 2020/0223449 | A1* | 7/2020 | Tsuji | G08G 1/09626 |
| 2021/0309231 | A1 | 10/2021 | Fujita | |
| 2021/0383693 | A1* | 12/2021 | Park | G08G 1/0965 |
| 2022/0314984 | A1* | 10/2022 | Takahashi | B60W 30/12 |
| 2023/0126130 | A1* | 4/2023 | Jeong | G01C 21/3881 |
| | | | | 701/533 |
| 2023/0278555 | A1* | 9/2023 | Kim | G08G 1/096741 |
| | | | | 701/41 |
| 2023/0386340 | A1* | 11/2023 | Takeyasu | B60W 30/09 |

* cited by examiner

DEVICE AND METHOD FOR GENERATING LANE INFORMATION

CROSS-REFERENCE TO RELATED APPLICATION

This application claims priority to and the benefit of Korean Patent Application No. 10-2021-0099621, filed on Jul. 29, 2021, the disclosure of which is incorporated herein by reference in its entirety.

TECHNICAL FIELD

The present disclosure relates to a method for generating lane information performed by an in-vehicle electronic device, and a device for generating lane information, and more specifically, to a method and device for generating information on a travel lane using information on structures around a vehicle and driving information of a surround vehicle.

BACKGROUND

The content described herein merely provides background information for the present disclosure and does not constitute prior art.

Recently, as vehicle functions are diversified, the number of vehicles equipped with various advanced driver assistance systems (ADASs) is increasing. Such a driver assistance system detects an accident that may occur while a vehicle is traveling or parked through communication with various sensors and warns a driver or controls the vehicle. A representative example of driver assistance systems is a lane keeping assistance system (LKAS). The lane keeping assist system warns the driver of lane departure when the vehicle is about to deviate from a lane due to negligence and controls the vehicle to stay in the lane.

In addition, driver assistance systems may realize an electronic stability program (ESP), adaptive cruise control (ACC), a lane departure warning system (LDWS), and the like.

Such a driver assistance system generally detects a lane by analyzing an image obtained through a camera and executes functions such as maintaining an inter-vehicle distance and maintaining a lane based on the recognized lane.

However, when it is difficult to identify a lane from an image obtained through a camera, the driver assistance system may malfunction or may not operate. For example, in a case where a lane is not detected using a camera, such as an intersection section without a lane, an unpaved road, an alleyway, or a road in rainy weather, the driver assistance system may not be able to perform a given function.

Therefore, there is a need for research on a method for inferring information on a road on which a vehicle is traveling in a situation where it is difficult to rely only on information obtained through a camera.

SUMMARY

Various aspects of the present disclosure are directed to providing a method for generating lane information performed by an in-vehicle electronic device. The method includes obtaining information on a structure located around a vehicle and driving information of a surround vehicle based on information collected by a sensor and prestored navigation information; and generating geometric information on a travel lane of the vehicle in a road area based on the information on the structure and the driving information of the surround vehicle.

According to at least another aspect, the present disclosure provides a device for generating lane information. The device includes an obtaining unit configured to obtain information on a structure located around a vehicle and driving information of a surround vehicle based on information collected by a sensor and prestored navigation information; and a control unit configured to generate geometric information on a travel lane of the vehicle in a road area based on the information on the structure and the driving information of the surround vehicle.

DETAILED DESCRIPTION

Figure 1:
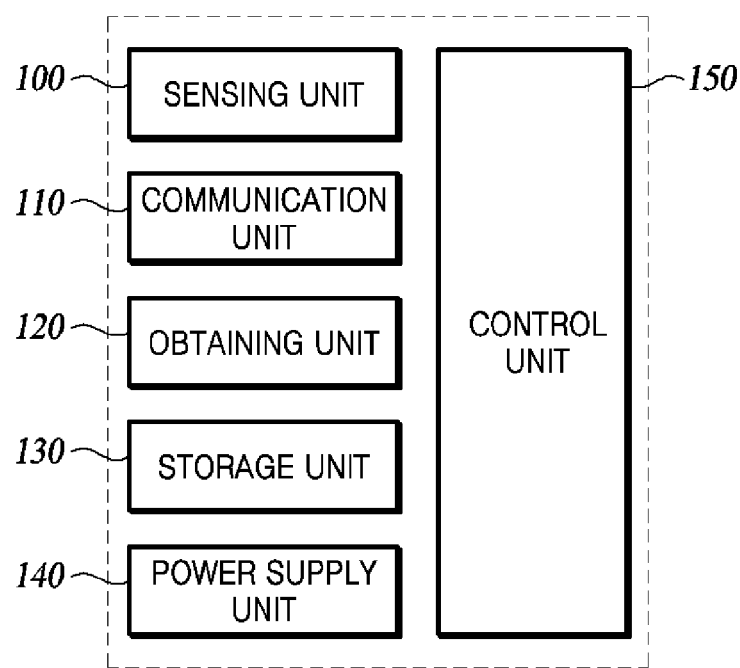
FIG. 1 is a configuration diagram illustrating a configuration of a vehicle according to an embodiment of the present disclosure.

A method and device for generating lane information according to an embodiment can accurately generate information on a lane in which a vehicle is traveling using information on structures around the vehicle and driving information of surround vehicles in a situation in which information obtained through a camera is inaccurate.

The method and device for generating lane information according to an embodiment can accurately control a driver assistance system or an autonomous driving system using lane information generated according to information on structures around a vehicle and driving information of surround vehicles.

The problems to be solved by the present disclosure are not limited to the problems mentioned above, and other problems that are not mentioned will be clearly understood by those skilled in the art from the following description.

Hereinafter, some embodiments of the present disclosure will be described in detail with reference to exemplary drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure, which may obscure the subject matter of the present disclosure, will be omitted.

In addition, terms, such as "first", "second", "i)", "ii)", "a)", "b)", or the like, may be used in describing the components of the present disclosure. These terms are intended only for distinguishing a corresponding component from other components, and the nature, order, or sequence of the corresponding component is not limited by the terms. In the specification, when a unit 'includes' or 'is provided with' a certain component, it means that other components may be further included, without excluding other components, unless otherwise explicitly stated.

Each component of the device or method according to the present disclosure may be implemented as hardware or software, or a combination of hardware and software. In addition, the function of each component may be implemented as software and a microprocessor may execute the function of software corresponding to each component.

Hereinafter, a type of a vehicle includes a host vehicle and a remote vehicle. The host vehicle is a vehicle that performs the method for generating lane information according to an embodiment of the present invention, and the remote vehicle is a vehicle other than the host vehicle. The host vehicle is referred to as a 'vehicle', and remote vehicles are referred to as a 'surround vehicle'.

FIG. 1 is a configuration diagram illustrating a configuration of a vehicle according to an embodiment of the present disclosure.

Referring to FIG. 1, a vehicle 10 includes a sensing unit 100, a communication unit 110, an obtaining unit 120, a storage unit 130, a power supply unit 140, or a control unit 150. A device for generating lane information (hereinafter, referred to as an "electronic device") according to an embodiment of the present disclosure includes the obtaining unit 120 and the control unit 150. The electronic device may further include the sensing unit 100 and the communication unit 110 as necessary.

The sensing unit 100 collects driving information of the vehicle 10, driving information of surround vehicles, and environment information.

The sensing unit 100 collects information using at least one of a camera, a radar, a LiDAR, or an ultrasonic sensor. In particular, the sensing unit 100 may capture an image of the surrounding area of the vehicle 10 using a camera or measure a distance between the vehicle 10 and a neighboring object or a speed using a radar. An image captured by the camera may include structures around the vehicle 10 or surround vehicles.

The sensing unit 100 may further use at least one of a global positioning system (GPS), a wheel speed sensor, a steering angle sensor, and a yaw rate sensor or a gyroscope sensor to collect position information and driving information of the vehicle 10.

The communication unit 110 performs wireless communication with external devices such as a surround vehicle and an external server. Further, the communication unit 110 may communicate with internal sensors and controllers of the vehicle 10.

The communication unit 110 may receive driving information from a surround vehicle or transmit driving information of the vehicle 10 to a surround vehicle. Here, the driving information includes a vehicle position, speed, vehicle width, direction, heading angle, path history, predicted path, steering wheel angle, acceleration information, full length, vehicle height, braking system state, indicator light state, and the like.

Further, the communication unit 110 may transmit/receive information to/from an external server through a base station or a roadside device. Here, the external server may be a server of an intelligent transport system (ITS). The communication unit 110 may receive traffic conditions, accident information, and the like from the external server and may transmit the state and driving information of the vehicle 10 to the external server.

The communication unit 110 may use at least one of a vehicular ad hoc network (VANET), wireless access in vehicular environments (WAVE), dedicated short range communication (DSRC), communication access in land mobile (CALM), vehicle-to-everything (V2X) communication, vehicle-to-vehicle (V2V) communication, vehicle-to-infra (V2I) communication, or vehicle-to-network (V2N) communication as an external communication method for the vehicle 10.

The communication unit 110 may use at least one of a controller area network (CAN), CAN with flexible data rate (CAN FD), Ethernet, local interconnect network (LIN), or FlexRay as an internal communication method for the vehicle 10.

However, the communication method of the communication unit 110 is not limited to the above-described methods, and any protocol for communication of the vehicle 10 may be applied.

The storage unit 130 stores various programs and data necessary for driving the vehicle 10. For example, the storage unit 130 may store data processed by the control unit 160. Furthermore, the storage unit 130 may store various types of data necessary for autonomous driving and/or driving assistance of the vehicle 10.

The storage unit 130 may store map information. Specifically, the storage 130 may store a navigation map as map information.

According to an embodiment of the present disclosure, navigation information may provide information necessary for autonomous driving and/or driving assistance of the vehicle 10, such as curvatures of roads, road structures, road types, the number of lanes on a road, locations of buildings, building types, road types, tunnel information, intersection information, road boundaries, traffic signs, and road signs.

The power supply unit 140 supplies power to components in the vehicle 10.

The obtaining unit 120 obtains information about structures located in the vicinity of the vehicle 10 and driving information of surround vehicles based on information collected by the sensing unit 100 and navigation information prestored in the storage unit 130.

Specifically, the obtaining unit 120 may obtain information on structures around the vehicle 10 and driving information of surround vehicles from at least one of an image captured through a camera, radar data collected through a radar, or prestored navigation information.

According to an embodiment of the present disclosure, information on a structure includes at least one of the location, size, or type of the structure. Here, a structure type refers to the type of a stationary object such as a building, a guard rail, a traffic light, a street light, a tunnel wall, a boundary stone, an electric pole, or a median strip. A structure type may be determined according to preset classification.

Information on a structure may be obtained based on information collected by the sensing unit 100 and navigation information stored in the storage unit 130. For example, the obtaining unit 120 may identify the location, area, and size of a structure from an image or radar data and may identify the type of the structure from navigation information.

According to an embodiment of the present disclosure, driving information of a surround vehicle includes at least one of a location, a stop history, or a route history of the surround vehicle. Here, the stop history of the surround vehicle means a history of stop of the surround vehicle at a specific location for a predetermined time. The route history of the surround vehicle means past routes derived from past locations of the surround vehicle.

Driving information of a surround vehicle may be obtained from information collected by the sensing unit 100. For example, the obtaining unit 120 may obtain information such as locations, speeds, stop histories or route histories of surrounding vehicles from images or radar data.

The obtaining unit 120 may further obtain information on the type of the road on which the vehicle 10 is located. For example, the obtaining unit 120 may obtain information indicating whether the road on which the vehicle 10 is located is an unpaved road, an alleyway, a highway, a general road, or a road in a tunnel based on information collected by the sensing unit 100 and navigation information. The logic for generating geometric information of a travel lane of the vehicle 10 varies according to the type of the road on which the vehicle 10 is located.

The control unit 150 generates information on a lane in which the vehicle 10 is traveling based on the information obtained by the obtaining unit 120.

Specifically, the control unit 150 generates geometric information of a travel lane of the vehicle 10 in a road area based on information on structures and driving information of surround vehicles.

According to an embodiment of the present disclosure, geometric information on a travel lane includes at least one of the position, width, curvature, or curvature rate of a travel lane of the vehicle 10. Here, the position of the travel lane means the order of travel lanes in which the vehicle 10 is located in a road including a plurality of lanes.

Here, the curvature or curvature rate of a travel lane of the vehicle 10 may be calculated according to the type of the road on which the vehicle 10 is located.

An example in which the control unit 150 generates geometric information of a travel lane of the vehicle 10 is illustrated in FIGS. 2 to 5.

According to an embodiment of the present disclosure, upon determining that the vehicle 10 is located in an area where it is difficult to detect a lane based on the location of the vehicle 10 and navigation information, the control unit 150 may generate geometric information of a travel lane of the vehicle 10. For example, the control unit 150 may generate geometric information of a travel lane of the vehicle 10 on an unpaved road or an intersection without lanes.

Meanwhile, the control unit 150 may detect a lane in which the vehicle 10 is traveling based on the information collected by the sensing unit 100. For example, the control unit 150 may detect lanes from an image captured by a camera.

The control unit 150 may generate a driving route of the vehicle 10 using the detected lanes and control the vehicle 10 according to the driving route.

However, there may be a situation in which it is difficult for the control unit 150 to detect lanes from the information collected by the sensing unit 100. There may be situations in which it is difficult to identify lanes or it is impossible to detect lanes, such as intersections, unpaved roads, alleyways, and roads in rainy weather.

In this case, the control unit 150 may correct a lane or generate a driving route of the vehicle 10 based on geometric information of travel lanes of the vehicle 10.

Specifically, when a lane is not detected at all, the control unit 150 may generate a driving route of the vehicle 10 based on generated geometric information. That is, the control unit 150 may generate a driving route of the vehicle 10 based on at least one of the position, width, curvature, or curvature rate of the lane in which the vehicle 10 is traveling.

On the other hand, when detected lane information is not valid, the control unit 150 may correct a lane detected by the sensing unit 100 based on the generated geometric information. That is, when the accuracy of a detected lane is low, the control unit 150 may correct the lane based on at least one of the position, width, curvature, or curvature rate of the lane in which the vehicle 10 is traveling.

In addition, the control unit 150 may control the driver assistance system or autonomous driving of the vehicle 10 based on generated lanes or corrected lanes.

The control unit 150 may control at least one of an engine management system (EMS), electronic stability control (ESC), an electronic stability program (ESP), vehicle dynamic control (VDC), a lane keeping assistance system (LKAS), smart cruise control (SCC), adaptive cruise control (ACC), autonomous emergency braking (AEB), highway driving assist (HDA), highway driving pilot (HDP), a lane departure warning (LDW), a driver awareness warning (DAW), or a driver state warning (DSW) as a function of the driver assistance system.

Figure 2:
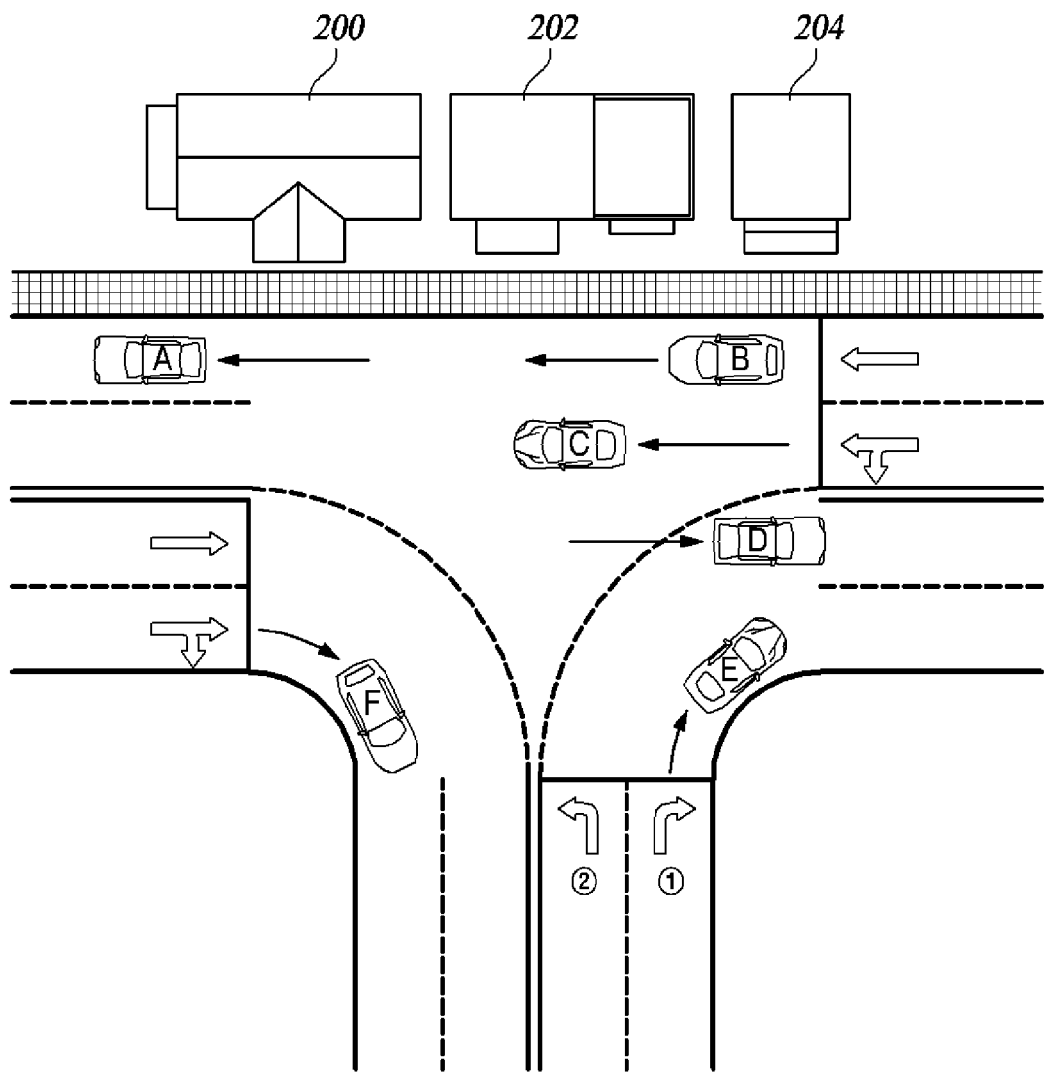
FIG. 2 is a diagram illustrating an embodiment of generating lane information according to an embodiment of the present disclosure.

FIG. 2 is a diagram illustrating an embodiment of generating lane information according to an embodiment of the present disclosure.

The electronic device according to an embodiment of the present disclosure may generate geometric information on a travel lane in which a vehicle (not shown) is located based on information on structures at an intersection and information on surround vehicles.

FIG. 2 shows a plurality of structures 200, 202 and 204 and a plurality of surround vehicles. The plurality of surround vehicles includes vehicle A, vehicle B, vehicle C, vehicle D, vehicle E, and vehicle F.

According to an embodiment of the present disclosure, when the vehicle intends to make a right turn at position 1, the electronic device may generate geometric information on the right turn lane based on information on the plurality of structures 200, 202 and 204 and driving information of the plurality of surround vehicles.

Specifically, the electronic device confirms that the vehicle is located at an intersection based on navigation information and the location of the vehicle.

The electronic device obtains driving information of the plurality of surround vehicles through sensors. The electronic device may obtain route histories of vehicles E and D. Further, when vehicle C and vehicle B have histories of stopping at stop lines, the electronic device may obtain stop histories of vehicle C and vehicle B.

Furthermore, the electronic device obtains information on the positions, sizes, and types of the plurality of structures 200, 202 and 204 based on navigation information. The electronic device may further obtain arrangement information of the plurality of structures 200, 202 and 204.

The electronic device may generate at least one of a position, width, curvature, or curvature rate of the travel lane at position 1 based on the route history of vehicle D, the route history of vehicle E, the stop history of vehicle B, the stop history of vehicle C, and the locations of the plurality of structures 200, 202 and 204.

For example, since vehicle E is traveling in the same lane as the travel lane of the vehicle, the electronic device may generate geometric information on the travel lane of the vehicle according to the route history of vehicle E. Further, since vehicle B, vehicle C, and vehicle D are traveling in lanes of the road that the vehicle intends to enter and the plurality of structures 200, 202 and 204 are located around the vehicle, the electronic device may generate geometric information on the travel lane of the vehicle in a range that does not overlap with the stop history of vehicle B, the stop history of vehicle C, the route history of vehicle D, and the locations of the plurality of structures 200, 202 and 204.

According to an embodiment of the present invention, when the vehicle intends to turn left at position 2, the electronic device may generate geometric information on the left turn lane based on the information on the plurality of structures 200, 202 and 204 and driving information of a plurality of surround vehicles.

Specifically, the electronic device confirms that the vehicle is located at the intersection based on the navigation information and the location of the vehicle.

The electronic device obtains driving information of a plurality of surround vehicles through sensors. The electronic device may obtain route histories of vehicle A, vehicle B, vehicle C, vehicle D, and vehicle F. Further, when vehicle F has a history of stopping at stop lines, the electronic device may obtain the stop history of vehicle F.

Furthermore, the electronic device obtains information on the locations, sizes, and types of the plurality of structures 200, 202 and 204 based on the navigation information. The electronic device may further obtain arrangement information of the plurality of structures 200, 202 and 204.

The electronic device may generate at least one of a position, width, curvature, or curvature rate of the lane for left turn at position 2 based on the route histories of vehicle A, vehicle B, vehicle C, vehicle D, and vehicle F, the stop history of vehicle F, and the information on the plurality of structures 200, 202 and 204.

The electronic device may generate a driving route of the vehicle based on geometric information on the travel lane of the vehicle or may correct a lane that is not identified by a camera. For example, the electronic device may generate a driving route according to the right turn lane at position 1. The vehicle travels along the generated driving route.

In this way, the electronic device generating information on the lane in which the vehicle is located can generate geometric information of the travel lane of the vehicle based on information on structures and driving information of surround vehicles and may control the driver assistance system or autonomous driving system.

Figure 3:
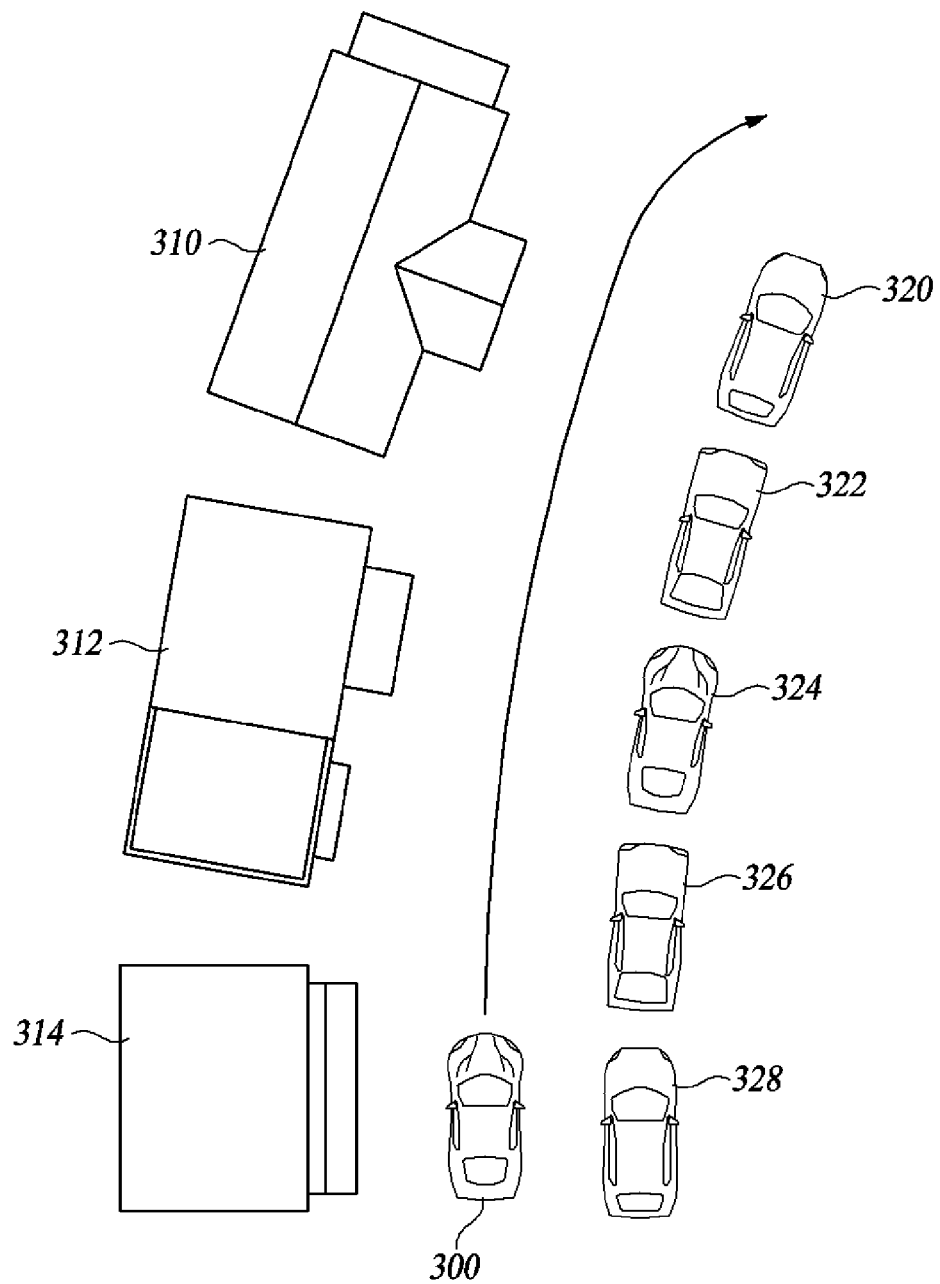
FIG. 3 is a diagram illustrating an embodiment of generating lane information according to an embodiment of the present disclosure.

FIG. 3 is a diagram illustrating an embodiment of generating lane information according to an embodiment of the present disclosure.

Referring to FIG. 3, the electronic device according to an embodiment of the present disclosure may generate geometric information on a travel lane in which a vehicle 300 is located on a road without lanes based on information on a plurality of structures 310, 312 and 314 and information on a plurality of surround vehicles 320, 322, 324, 326 and 328.

The electronic device may generate at least one of a position, width, curvature, or curvature rate of the travel lane of the vehicle 300 based on the locations and arrangement information of the plurality of structures 310, 312 and 314 and the locations and arrangement information of the plurality of surround vehicles 320, 322, 324, 326 and 328.

According to an embodiment of the present disclosure, the electronic device may generate geometric information on the travel lane of the vehicle 300 in consideration of the types of the plurality of structures 310, 312 and 314. For example, when the structures 310, 312 and 314 are buildings, the electronic device may create a wide travel lane of the vehicle 300. On the other hand, when the structures 310, 312 and 314 are guard rails, the electronic device may create a narrow travel lane.

The electronic device may generate a driving route of the vehicle 300 or correct a lane detected by a camera according to the generated geometric information.

Figure 4:
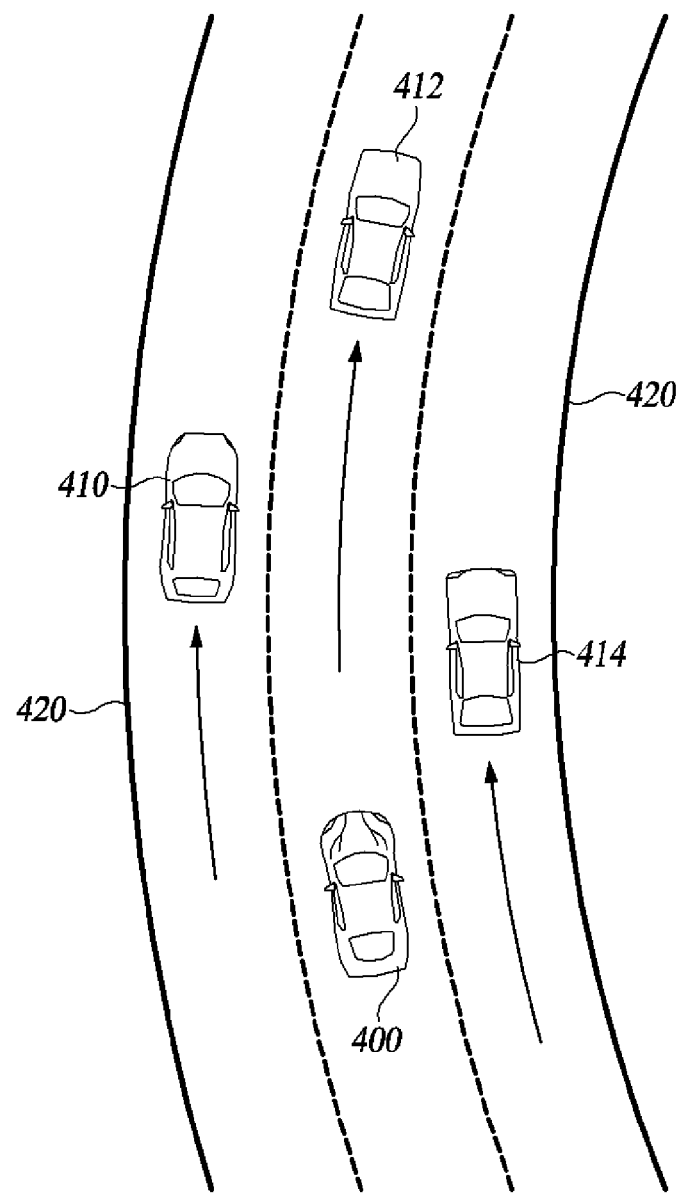
FIG. 4 is a diagram illustrating an embodiment of generating lane information according to an embodiment of the present disclosure.

FIG. 4 is a diagram illustrating an embodiment of generating lane information according to an embodiment of the present disclosure.

Referring to FIG. 4, when information collected by sensors according to an embodiment of the present disclosure is inaccurate, the electronic device may generate geometric information on a travel lane in which a vehicle 400 is located based on information on a tunnel wall 420 and driving information of a plurality of surround vehicles 410, 412 and 414.

The electronic device may generate geometric information on the travel lane of the vehicle 400 based on the location, area, and type of the tunnel wall 420 and the locations and route histories of the plurality of surround vehicles 410, 412 and 414. In FIG. 4, since route histories of the plurality of surround vehicles 410, 412 and 414 are all curved to the right, the electronic device may generate a curvature and a curvature rate of the travel lane of the vehicle 400 which is curved to the right. Further, since the tunnel wall 420 is curved to the right, the electronic device may generate a curvature and a curvature rate of the travel lane of the vehicle 400 which is curved to the right. In addition, the electronic device may generate at least one of a position, width, curvature, or curvature rate of the lane in which the vehicle 400 is traveling based on the positions and the route histories of the plurality of surround vehicles 410, 412 and 414.

The electronic device may generate a driving route of the vehicle 400 or correct a lane detected by a camera according to the generated geometric information.

Figure 5:
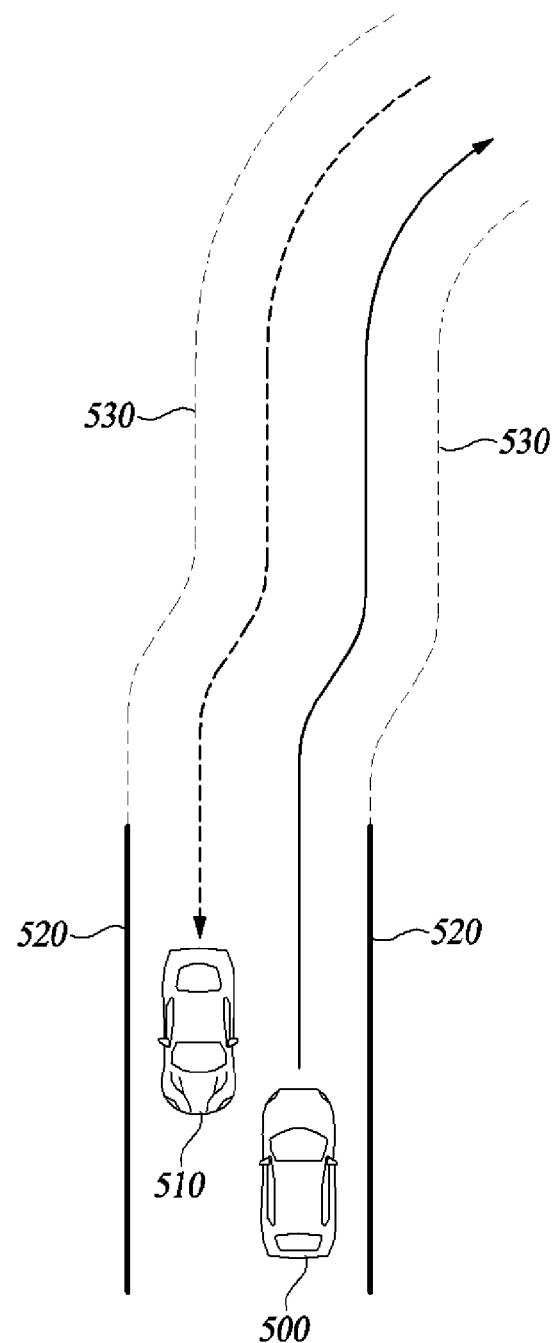
FIG. 5 is a diagram illustrating an embodiment of generating lane information according to an embodiment of the present disclosure.

FIG. 5 is a diagram illustrating an embodiment of generating lane information according to an embodiment of the present disclosure.

Referring to FIG. 5, according to an embodiment of the present disclosure, the electronic device may generate geometric information on a travel lane in which a vehicle 500 is located in an unpaved road section 530 without lanes based on driving information of a surround vehicle 510.

The electronic device may determine that the vehicle 500 enters the unpaved road section 530 without lanes from a general road 520 based on navigation information or information collected by sensors.

The electronic device obtains the location and route history of the oncoming surround vehicle 510. The electronic device may generate information on at least one of the location, width, curvature, and curvature rate of the travel lane of the vehicle 500 based on the location or route history of the surround vehicle 510. Furthermore, the electronic device may generate geometric information on the travel lane of the vehicle 500 by further considering the locations and arrangement information of a guard rail, trees, and street lamps located on the shoulders as information on structures.

The electronic device may generate a driving route of the vehicle 500 or may correct a lane detected by a camera according to the generated geometric information.

Figure 6:
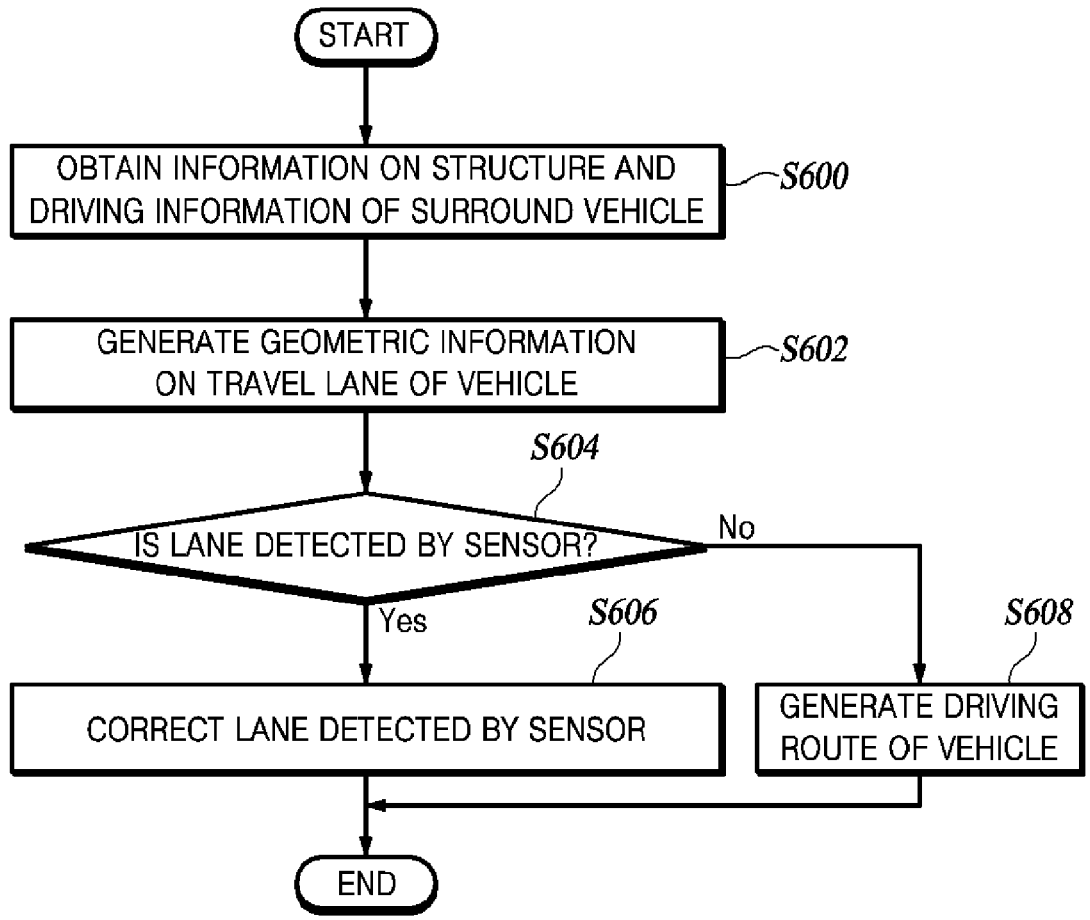
FIG. 6 is a flowchart illustrating a method of generating lane information according to an embodiment of the present disclosure.

FIG. 6 is a flowchart illustrating a method of generating lane information according to an embodiment of the present disclosure.

Referring to FIG. 6, the in-vehicle electronic device obtains information on a structure located around the vehicle and driving information of surround vehicles based on information collected by sensors and prestored navigation information (S600).

Here, the information on the structure includes at least one of the location, size, or type of the structure. In addition, the driving information of the surround vehicle includes at least one of the location, stop history, or route history of the surround vehicle.

The electronic device generates geometric information on a travel lane of the vehicle in a road area based on the information on the structure and the driving information of the neighboring vehicles (S602).

Here, the geometric information of the travel lane of the vehicle includes at least one of the position, width, curvature, or curvature rate of the travel lane.

Thereafter, the electronic device determines whether a lane is detected by a sensor (S604).

When a lane is detected by the sensor, the electronic device corrects the lane detected by the sensor based on the geometric information of the travel lane of the vehicle (S606).

On the other hand, when a lane is not detected by the sensor, the electronic device may directly generate a driving route of the vehicle based on the geometric information of the travel lane of the vehicle (S608).

The electronic device may control a driver assistance system or an autonomous driving system of the vehicle based on the corrected lane or the generated driving route.

Through the above-described operation, the electronic device can generate geometric information of the travel lane of the vehicle based on the information on the structure and the driving information of the surround vehicle on a road where it is difficult to detect a lane by the sensor or there are no lanes. Furthermore, the electronic device can correct a lane or generate a driving route according to the geometric information and use the corrected lane or the generated driving route for the driver assistance system or the autonomous driving system.

According to an embodiment, the method and device for generating lane information can accurately generate information on a lane in which a vehicle is traveling using information on structures around the vehicle and driving information of surround vehicles in a situation in which information obtained through a camera is inaccurate.

According to an embodiment, the method and device for generating lane information can accurately control a driver assistance system or an autonomous driving system using lane information generated according to information on structures around a vehicle and driving information of surround vehicles.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include an implementation using one or more computer programs executable on a programmable system. The programmable system includes at least one programmable processor (which may be a special purpose processor or a general-purpose processor) coupled to receive and transmit data and instructions from and to a storage system, at least one input device, and at least one output device. Computer programs (also known as programs, software, software applications or codes) contain instructions for a programmable processor and are stored in a "computer-readable recording medium".

The computer-readable recording medium includes all types of recording devices in which data readable by a computer system are stored. The computer-readable recording medium may include non-volatile or non-transitory, such as ROM, CD-ROM, magnetic tape, floppy disk, memory card, hard disk, magneto-optical disk, and storage device, and may further include a transitory medium such as a data transmission medium. In addition, the computer-readable recording medium may be distributed in a network-connected computer system, and the computer-readable codes may be stored and executed in a distributed manner.

Although it is described that each process is sequentially executed in the flowchart/timing diagram of the present specification, this is merely illustrative of the technical idea of one embodiment of the present disclosure. In other words, since an ordinary skilled person in the art to which thee embodiments of the present disclosure pertain may make various modifications and changes by changing the order described in the flowchart/timing diagram without departing from the essential characteristics of the present disclosure or performing in parallel one or more of the steps, the flowchart/timing diagram is not limited to a time-series order.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

What is claimed is:

1. A method for generating lane information performed by an in-vehicle electronic device, the method comprising:
    obtaining information on a structure located around a vehicle and driving information of a surround vehicle based on information collected by a sensor and prestored navigation information; and
    generating geometric information on a travel lane of the vehicle in a road area based on the information on the structure and the driving information of the surround vehicle,
    wherein the geometric information on the travel lane includes a position, a width, a curvature, and a curvature rate of the travel lane,
    wherein the driving information of the surround vehicle includes a stop history of the surround vehicle,
    wherein the stop history of the surround vehicle includes a history of stop of the surround vehicle at a specific location for a predetermined time, and
    wherein the generating geometric information on a travel lane of the vehicle comprises determining the width of the travel lane depending on a type of the structure.

2. The method of claim 1, wherein the information on the structure includes at least one of a location, a size, or the type of the structure.

3. The method of claim 1, wherein the driving information of the surround vehicle further includes at least one of a location, or a path history of the surround vehicle.

4. The method of claim 1, further comprising correcting a lane detected by the sensor based on the geometric information on the travel lane.

5. The method of claim 1, further comprising generating a travel route of the vehicle based on the geometric information on the travel lane.

6. A device for generating lane information, comprising:
at least one non-transitory memory storing computer-executable instructions; and
at least one processor,
wherein execution of the computer-executable instructions causes the at least one processor to: obtain information on a structure located around a vehicle and driving information of a surround vehicle based on information collected by a sensor and prestored navigation information; and
generate geometric information on a travel lane of the vehicle in a road area based on the information on the structure and the driving information of the surround vehicle,
wherein the geometric information on the travel lane includes a position, a width, a curvature, and a curvature rate of the travel lane,
wherein the driving information of the surround vehicle includes a stop history of the surround vehicle,
wherein the stop history of the surround vehicle includes a history of stop of the surround vehicle at a specific location for a predetermined time, and
wherein the at least one processor determines the width of the travel lane depending on a type of the structure.

7. The device of claim 6, wherein the information on the structure includes at least one of a location, a size, or the type of the structure.

8. The device of claim 6, wherein the driving information of the
surround vehicle further includes at least one of a location or a route history of the surround vehicle.

9. The device of claim 6, wherein the at least one processor
corrects a lane detected by the sensor based on the geometric information on the travel lane.

10. The device of claim 6, wherein the at least one processor generates a driving route of the vehicle based on the geometric information on the travel lane.

11. A non-transitory computer-readable recording medium storing instructions, the instructions causing a computer, when executed by the computer, to:
obtain information on a structure located around a vehicle and driving
information of a surround vehicle based on information collected by a sensor and prestored navigation information; and
generate geometric information on a travel lane of the vehicle in a road area
based on the information on the structure and the driving information of the surround vehicle,
wherein the geometric information on the travel lane includes a position, a width, a curvature, and a curvature rate of the travel lane,
wherein the driving information of the surround vehicle includes a stop history of the surround vehicle,
wherein the stop history of the surround vehicle includes a history of stop of the surround vehicle at a specific location for a predetermined time, and
wherein the instructions further cause the computer, when executed by the computer, to determine the width of the travel lane depending on a type of the structure.

12. The non-transitory computer-readable recording medium of claim 11,
wherein the information on the structure includes at least one of a location, a size, or the type of the structure.

13. The non-transitory computer-readable recording medium of claim 11,
wherein the driving information of the surround vehicle further includes at least one of a location or a path history of the surround vehicle.

14. The non-transitory computer-readable recording medium of claim 11,
wherein the instructions further cause the computer, when executed by the computer, to correct a lane detected by the sensor based on the geometric information on the travel lane.

15. The non-transitory computer-readable recording medium of claim 11,
wherein the instructions further cause the computer, when executed by the computer, to generate a travel route of the vehicle based on the geometric information on the travel lane.

* * * * *